June 9, 1936.  R. WISE  2,043,846
MEANS FOR MOLDING CONFECTION
Filed July 27, 1934  2 Sheets-Sheet 1
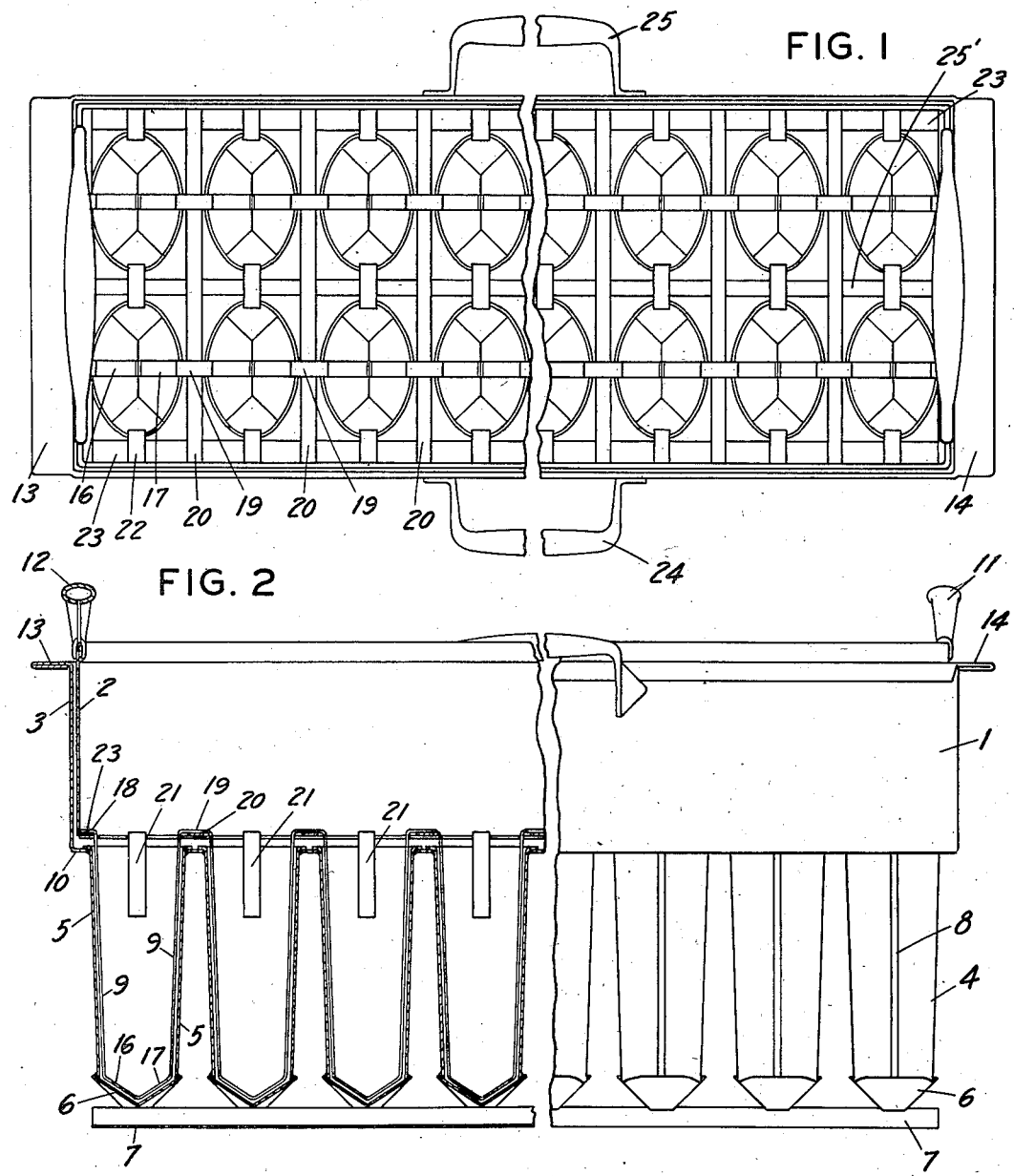

June 9, 1936.  R. WISE  2,043,846
MEANS FOR MOLDING CONFECTION
Filed July 27, 1934  2 Sheets-Sheet 2
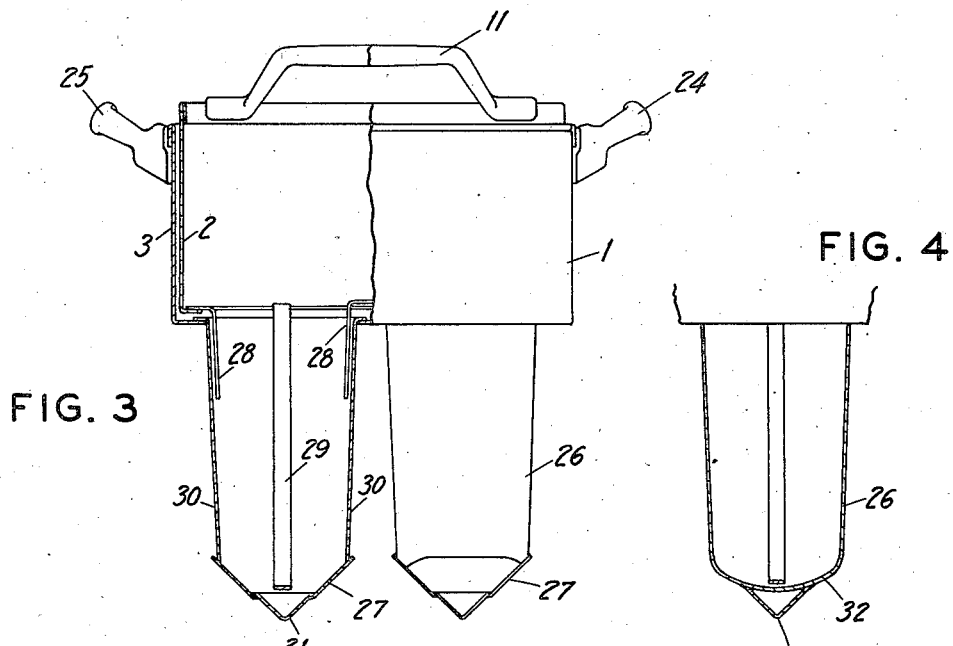
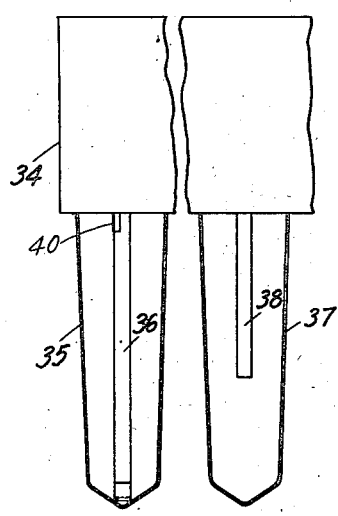
INVENTOR
Robert Wise
BY
Ezekiel Wolf
ATTORNEY

Patented June 9, 1936

2,043,846

UNITED STATES PATENT OFFICE 2,043,846

MEANS FOR MOLDING CONFECTION

Robert Wise, Winthrop, Mass.

Application July 27, 1934, Serial No. 737,263

4 Claims. (Cl. 107—19)

The present invention relates to a method and means of molding frozen confection, and particularly to the means of removing the confection from the mold.

In systems commonly employed at the present time the confection is placed in a container in a liquid form, the container having a great number of mold forms at the bottom. The confection is frozen in this manner and in order to aid the removal of the confection, sticks are placed in the confection before freezing, which freeze with the confection and provide a means for holding the confection when it has been freed from the side of the mold. The confection is usually freed from the side of the mold after it has been frozen by dipping the mold in hot water. This frees the confection from the mold and the confection may be raised by means of the stick which was suspended in the confection when it was liquid.

For the purpose of suspending the stick in the confection, a frame is usually employed which has a great number of clamping elements that position and clamp the sticks in the center of the mold forms. It is usual in practice to mold a number at a time. In the present invention the use of sticks is avoided and the confection is removed as a whole unit in the form desired.

In the practice in the prior art great difficulty has been encountered not so much in removal of the forms from the mold, but more particularly in preventing the confection from becoming contaminated with the brine and water that the mold itself comes in contact with. It is also true that a certain amount of the syrup in the container above the forms may still be in a liquid state, and this coming in contact with the brine or other refrigerant means is apt to contaminate the confection so that it cannot be used.

In the present invention this difficulty is avoided and it is a comparatively simple matter to keep the confection free and clear of any such contamination as may be present in the freezing process.

The invention will be more fully described in connection with the annexed drawings in which Fig. 1 shows a plan view of the device used in the present method; Fig. 2 shows a vertical view partly full and partly in section; Fig. 3 shows a modified end view of Fig. 1; Fig. 4 shows a still further modification; and Fig. 5 shows a modification of the element that fits into the mold.

In Figs. 1 and 2 it will be noted that there are two separate elements that cooperate together. The device as a whole comprises an outside container 1 having walls 3 and a base frame 10, which base frame is provided with a great number of perforations. In practice it is common to use as many as two dozen forms in one mold. Therefore, the base plate 10 would have two dozen perforations. The mold 4 fits over the perforation in the container 3 and may be comprised of the side walls 5 and a joining rib 8, the mold itself as shown in Figs. 1 and 2 being somewhat prismatical and tapered from a larger dimension at the base plate 10 to a smaller dimension at the lower end of the mold. The lower end of the mold may be capped by a cap 6 and all of the molds may be supported together by a bar or beam 7. The external mold, as indicated in Fig. 1, is provided with handles 24 and 25 on one pair of the opposite sides and with flanges 13 and 14 on the other two sides.

Fitting closely within the container 3 is a frame 2 which is made up of an enclosing wall and an inwardly extending flange 23 at the lower end of the frame which extends all the way around the frame. Coinciding with each mold and fitting closely to the side walls of the mold is a band or strip with side elements 9 and bottom elements 16 and 17 forming a continuous band around the inside of the mold. This band is made fast to the flange 23 on one side of the frame and to a cross strip 20 running across the frame from the flange on one side to the flange on the other side. In addition to a continuous band passing down around the opposite sides of the mold 4, which band substantially lies in a plane as indicated in Figs. 1 and 2, there is an additional group of strips at opposite ends of the upper perforation in the mold, these strips 21 being attached to the cross band 25', as indicated in Fig. 1. The strips 21 extend downward into the side of the forms or molds 4 at opposite sides and substantially in a plane perpendicular to a plane of the band previously described.

The internal frame 2 is not only provided with the long cross band 25' but with a series of transverse bands 20, thus forming a complete pattern about the mold for the support of the continuous band and the short strips projecting into the mold. As indicated in Figs. 1 and 2 the internal frame is provided with handles 11 and 12 which are positioned adjacent and extending upward from the flanges 13 and 14 at the side of the container 1. As indicated in these figures the mold may be made of two pieces 5 and 5 joined together at the sides by strips 8 and covered at the bottom with a cap 6. This will produce a mold having distinct side lines.

A modification of this form is indicated in

Figs. 3 and 4. In Fig. 3, which shows an end view of the device indicated in Fig. 1 partly in section and partly in full view, the body of the mold 26 is made of a seamless round cone 30 frustrated at the bottom which is capped as indicated in Fig. 3 by a conical cap 27. A band similar to that indicated in Figs. 1 and 2 is indicated at 29 in Fig. 3 and the short projecting strips as 28 at opposite sides of the continuous band 29.

In Fig. 4 a still further modification is shown of the elements shown in Fig. 3. In this case the form is rounded as in Fig. 3 but capped at the bottom by a cup-shaped element 32 which may be supported as indicated by the V-support 33 which is also shown as 31 in Fig. 3 and which may extend the length of the molds.

In Fig. 5 a still further modification is shown. In this figure the internal frame is shown with a number of various kinds of supporting bands which fit into the mold forms. In the illustration at the left of Fig. 5 two complete bands 35 and 36 are shown, while in the illustration to the right of this is a single band 37 is shown with a long extending strip 38 at the side of it. A spacing pin 40 is also shown for spacing the inner frame from the container. This is also used in Figs. 1 and 2.

Various other methods of support may be used for the internal frame of the bands but I prefer to use the construction shown more particularly in Figs. 1 and 2.

In the operation of the present method and in using the present system the device described is employed as follows:

The confection is poured into the container 1, filling the container approximately to the flange 10. The molds are therefore completely filled. The internal frame may already have been placed within the container and the bands and side strips will therefore fit snugly in place against the walls of the molds.

The confection is frozen in this manner by putting the container in a bath of cool brine or some other refrigerating medium. When the confection is completely frozen, the entire container with the internal frame is withdrawn and placed for a few seconds into a vessel containing boiling water. This frees the confection from the sides of the mold 5. The container and mold are then removed and the internal frame raised. The frame is then inverted on a board and given a slight impact with the board which causes the molded confections to drop downward on to the board. The board may be of such a fashion as to fit within the frame 2 and the board itself may have molds in which paper cups may be placed in positions opposite to that of the confection itself so that when the confection drops downward, it will automatically fall into the cups. The confection is then packed in the usual fashion which may be in individual glassine bags and put away for distribution or sale.

Having now described my invention, I claim:

1. A device of the kind described comprising a mold for frozen confection adapted to receive the confection in liquid form and retain the same, said mold being tapered from a larger section to a smaller section gradually from the top to the bottom, a frame adapted to fit within said mold having a band fitting around the inside of the mold in a direction downward, and a second band extending part-way down each side of the mold on the inside and positioned in a plane substantially at right angles to the first band.

2. A device of the kind described comprising a mold for frozen confection adapted to receive the confection in liquid form having side walls tapered to form towards the lower end gradually smaller sections, a bottom sealing said mold, a frame adapted to fit within said mold having a narrow band extending down the sides of the mold and around the bottom, said frame having short bands also fitting within said mold on opposite sides of said first band.

3. A device of the kind described, comprising a container having a plurality of mold forms extending from the bottom thereof, a frame work fitting into the top of said container comprising a plurality of spaced elements positioned when the frame is in said container away from the entrance of said molds, a plurality of bands extending from said spaced elements into and around the inner wall of said molds and means provided on said frame for raising the same.

4. A device of the kind described, comprising a container having side walls and a bottom, a plurality of mold forms extending from the bottom of the container, a frame having side walls fitting within the side walls of said container and a grid like bottom arranged with strips lying with their edges at the edges of the mold forms, a plurality of bands extending from said strips around the inner walls of said molds and means provided on said frame for raising the same.

ROBERT WISE.